United States Patent
Reyes et al.

(10) Patent No.: US 11,306,241 B2
(45) Date of Patent: Apr. 19, 2022

(54) GEOCHEMICALLY-DRIVEN WETTABILITY MODIFICATION FOR SUBTERRANEAN SURFACES

(71) Applicant: Halliburton Energy Services, Inc., Houston, TX (US)

(72) Inventors: Enrique Antonio Reyes, Tomball, TX (US); Denise Nicole Benoit, Houston, TX (US); Ronald Glen Dusterhoft, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/617,777

(22) PCT Filed: Jun. 30, 2017

(86) PCT No.: PCT/US2017/040237
§ 371 (c)(1),
(2) Date: Nov. 27, 2019

(87) PCT Pub. No.: WO2019/005095
PCT Pub. Date: Jan. 3, 2019

(65) Prior Publication Data
US 2020/0190396 A1  Jun. 18, 2020

(51) Int. Cl.
*C09K 8/68* (2006.01)
*E21B 43/26* (2006.01)
(Continued)

(52) U.S. Cl.
CPC .............. *C09K 8/68* (2013.01); *C09K 8/602* (2013.01); *C09K 8/703* (2013.01); *E21B 43/26* (2013.01);
(Continued)

(58) Field of Classification Search
CPC ... C09K 8/60; C09K 8/62; C09K 8/64; C09K 8/66; C09K 8/68; C09K 8/70; C09K 8/72;
(Continued)

(56) References Cited

U.S. PATENT DOCUMENTS

| 5,868,862 A | 2/1999 | Douglas et al. |
| 6,435,277 B1 * | 8/2002 | Qu .................... C09K 8/68 |
| | | 166/281 |

(Continued)

FOREIGN PATENT DOCUMENTS

WO    2014138445    9/2014

OTHER PUBLICATIONS

ISRWO International Search Report and Written Opinion for PCT/US2017/040237 dated Apr. 23, 2018.
(Continued)

*Primary Examiner* — Angela M DiTrani Leff
(74) *Attorney, Agent, or Firm* — Thomas Rooney; C. Tumey Law Group PLLC

(57) ABSTRACT

Systems, methods, and compositions that provide an energized natural gas (ENG) fracturing fluid including a complexing agent. A fracturing fluid may include: methane; water; a complexing agent; a surfactant; and wherein the fracturing fluid is an emulsion, the water is in a continuous phase of the emulsion, and methane is in a discrete phase of the emulsion.

20 Claims, 3 Drawing Sheets

(51) Int. Cl.
*C09K 8/60* (2006.01)
*C09K 8/70* (2006.01)
*E21B 43/267* (2006.01)

(52) U.S. Cl.
CPC ........ *E21B 43/2605* (2020.05); *E21B 43/267* (2013.01)

(58) Field of Classification Search
CPC .......... C09K 8/74; C09K 8/602; C09K 8/703; C09K 8/665; E21B 43/26; E21B 43/267; E21B 43/2605; E21B 43/2607
See application file for complete search history.

(56) References Cited

U.S. PATENT DOCUMENTS

| | | | |
|---|---|---|---|
| 6,558,432 B2 | 5/2003 | Schulte et al. | |
| 2006/0065400 A1* | 3/2006 | Smith | E21B 43/26 166/308.1 |
| 2009/0301722 A1* | 12/2009 | Parlar | C09K 8/52 166/300 |
| 2010/0101796 A1 | 4/2010 | Leshchyshyn et al. | |
| 2013/0000901 A1 | 1/2013 | Welton | |
| 2014/0008074 A1* | 1/2014 | Nevison | C09K 8/62 166/308.6 |
| 2014/0116710 A1* | 5/2014 | Naser-El-Din | C09K 8/74 166/308.3 |
| 2014/0251626 A1* | 9/2014 | Gomaa | C09K 8/64 166/308.5 |
| 2014/0262265 A1 | 9/2014 | Hutchins et al. | |
| 2015/0218439 A1* | 8/2015 | Dean | C09K 8/72 166/308.2 |
| 2015/0361323 A1* | 12/2015 | Gamage | C09K 8/035 166/305.1 |
| 2016/0084058 A1* | 3/2016 | Nevison | E21B 43/168 166/308.1 |
| 2017/0137696 A1* | 5/2017 | Mohanty | E21B 43/16 |

OTHER PUBLICATIONS

Brady, P. V., & Thyne, G. (2016). Functional Wettability in Carbonate Reservoirs. Energy & Fuels, 30(11), 9217-9225.
Sohal, M. A., Thyne, G., & Søgaard, E. G. (2016). Novel Application of the Flotation Technique To Measure the Wettability Changes by Ionically Modified Water for Improved Oil Recovery in Carbonates. Energy & Fuels, 30(8), 6306-6320.
Wen, H., Li, L., Crandall, D., & Hakala, A. (2016) Where Lower Calcite Abundance Creates More Alteration: Enhanced Rock Matrix Diffusivity Induced by Preferential Dissolution. Energy & Fuels, 30(5), 4197-4208.
Generosi, J., Ceccato, M., Andersson, M. P., Hassenkam, T., Dobberschütz, S., Bovet, N., & Stipp, S. L. S. (2016). Calcite Wettability in the Presence of Dissolved $Mg^{2+}$ and $SO_4^{2-}$. Energy & Fuels, 31(1), 1005-1014.

* cited by examiner

GEOCHEMICALLY-DRIVEN WETTABILITY MODIFICATION FOR SUBTERRANEAN SURFACES

BACKGROUND

During subterranean operations, surfactants may be used to modify the subterranean formation faces to impart hydrophobic or hydrophilic properties. Surfactants can aid in production of oil and gas by allowing water and hydrocarbons to flow easier by disrupting the boundary layer created between water and oil. Conventional surfactants tend to be depleted over time as the surfactant molecules are produced alongside water and hydrocarbons. As such, the production rate may decrease over time due to decreased surfactant concentration.

BRIEF DESCRIPTION OF THE DRAWINGS

These drawings illustrate certain aspects of some of the embodiments of the present method, and should not be used to limit or define the method.

DETAILED DESCRIPTION

Figure 1:
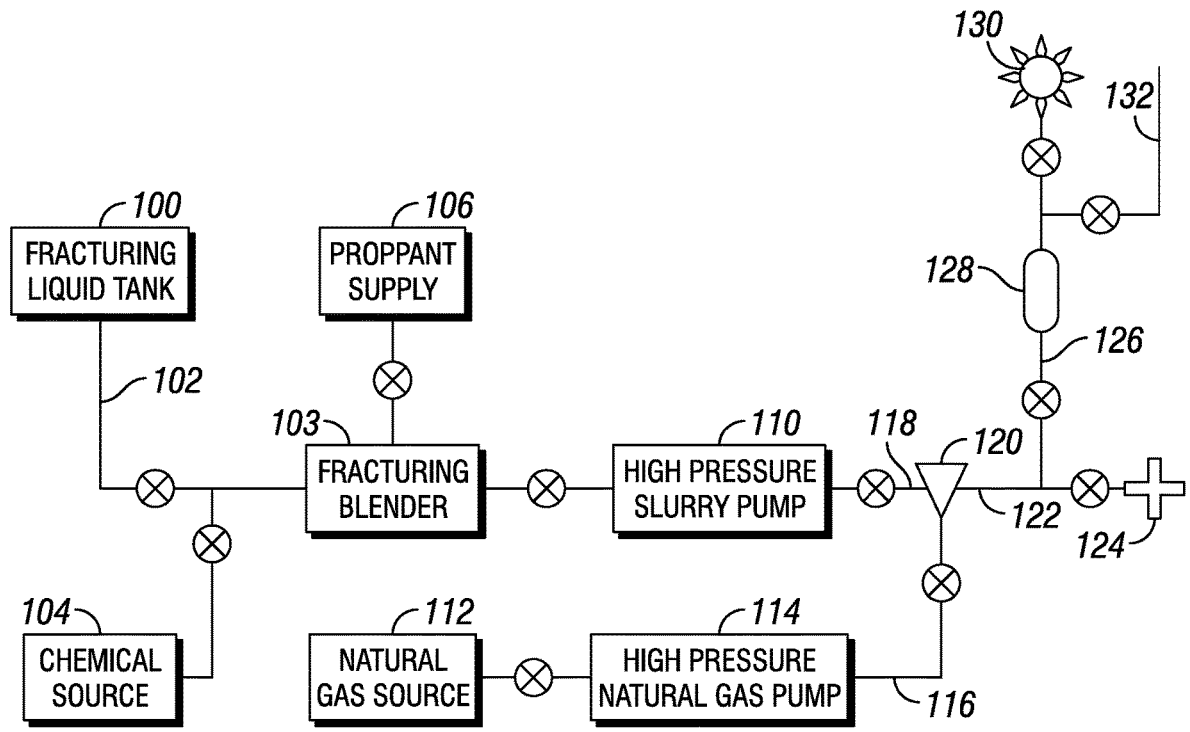
FIG. 1 is a schematic of a fracturing system for injecting a fracturing fluid mixture of natural gas and a liquid additive into a subterranean formation.

The systems, methods, and/or compositions disclosed herein may relate to subterranean operations and, in some systems, methods, and compositions, to providing an energized natural gas (ENG) fracturing fluid including a complexing agent.

Hydrocarbon extraction from unconventional subterranean formations, such as shale formations, may require the use of specialized materials to aid in hydrocarbon production. A shale formation may have extremely low permeability typically on the order of about $10^{-4}$ to about $10^{-10}$ millidarcy (mD) which can present challenges to flow of oil and gas. Hydraulic fracturing and ENG fracturing seek to increase the permeability of the subterranean formation by breaking apart the formation and creating fractures and flow paths for hydrocarbons. During fracturing, surfactants are often used to further increase the production capability of the formation by altering the surface wettability of the formation faces. In some shale reservoirs, the created fractures may include one or more main hydraulic fractures that branch with one or more natural fractures existing within the formation to create a complex fracture structure. During and after the fracturing process, fluid leak off from inside the fracture into the reservoir may result in small microfractures extending into the formation matrix, thereby increasing the exposed formation surface area. In general, the microfractures may be too narrow to enable proppant placement within the microfracture but the placement of complexing agents and surfactant can enable hydrocarbon to flow in the microfracture without the aid of a proppant. In this way, microfractures may contribute more effectively production.

Surfactants are included in fracturing fluid to enhance wettability to oil and gas in the formation. Surfactants can enhance oil displacement by weakly emulsifying or dissolving adhered hydrocarbons and knocking off adhered hydrocarbons from formation surfaces. Surfactants may be lost over time due to production of the surfactants injected with the fracturing fluid being produced alongside hydrocarbons. The present disclosure utilizes a fracturing fluid including complexing agent to alter the surface chemistry of the formation to allow for better binding of a surfactant to the formation faces and fractures as compared to a fracturing fluid that does not include the complexing agent.

The chemistry or geochemical surface composition of a hydrocarbon-bearing reservoir may be inadequate or incompatible for a surfactant to bind to. Altering the geochemical surface may provide a better binding site for a surfactant. Altering the surface may include a differential exchange of ions or mineral species from the geochemical surface. The differential exchange may be accomplished by the previously mentioned complexing agent. The differential exchange may include removal of calcium, for example, and filling the vacancy with another species, for example, magnesium. Magnesium may provide a surface anchoring site or binding site where the surfactants can adhere. Binding the surfactant to the surface may decrease the migration potential of the surfactant throughout production.

A natural gas stream for hydraulic fracturing may be provided as a gas and at pressure and rate sufficient to support the hydraulic fracturing of the subterranean formation. The natural gas stream may be blended with a liquid additive to form a fracturing fluid, or injected as a pure stream (i.e. without a liquid additive) or blended only with a proppant. The liquid additive may include a base fluid and one or more additional additives, such as a proppant, a viscosifier, a rheology modifier, a friction reducing polymer, a surfactant, or a complexing agent. Hydraulic energy to create the fracture in the subterranean reservoir is obtained from pressurization of the gaseous natural gas and the liquid additive at surface at combined rates sufficient to impart the needed energy at the subterranean formation to create one or more fractures. As used herein, creating a fracture is also intended to include extending an existing fracture in the subterranean formation. Following the fracture treatment, the natural gas and accompanying liquid additive may be recovered and the applied natural gas directed to facilities for recovery and sale.

As used in this disclosure, natural gas means methane ($CH_4$) alone or blends of methane with other gases such as other gaseous hydrocarbons. Natural gas is often a variable mixture of about 85% to 99% methane ($CH_4$) and 5% to 15% ethane ($C_2H_6$), with further decreasing components of propane ($C_3H_8$), butane ($C_4H_{10}$), pentane ($C_5H_{12}$), and their isomers, with traces of longer chain hydrocarbons. Natural gas, as used herein, may also contain inert gases such as carbon dioxide and nitrogen in varying degrees. Mixtures containing carbon dioxide and nitrogen above approximately 30% may degrade the effectiveness of the fracturing treatment.

A fracturing system may include equipment for storing the components of the fracturing fluid, equipment for injecting the natural gas-containing fracturing fluid mixture into a subterranean formation, such as an oil well or a gas well, and equipment for recovering and separating fluids from the well. In some examples, the natural gas source is compressed natural gas (CNG) held in pressurized vessels with a fracturing pump further compressing the natural gas to a suitable fracturing pressure. In other examples, the compressed natural gas is held in pressurized vessels above the fracturing pressure and released into the fracturing stream. In some embodiments, the gas source is a vessel containing liquefied natural gas (LNG) with the fracturing pump pressuring the LNG to fracturing pressure and heating the pressurized LNG stream. A natural gas source may also be from a pipeline or another gas well.

Efficient storage of gaseous phase natural gas may be achieved at the highest possible pressure which is typically less than 30 MPa (4,400 psi). Pressurization of the natural gas to the extremes typically needed for hydraulic fracturing can be accomplished with the feed in a gaseous phase. Gas phase compressors may be used to pressurize the gas to about 34 MPa (5000 psi) to about 138 MPa (20,000 psi) which may be suitable for fracturing.

Fracturing fluids containing natural gas may improve fracturing fluid removal from the well and post-fracture production performance. Using natural gas avoids fluid incompatibilities often found with the use of carbon dioxide or nitrogen as the energizing fluid. Upon completion of the fracturing treatment, the natural gas component may be recovered with the fracturing fluid and the reservoir oil and/or gas. The injected natural gas may be recovered within the existing oil and/or gas processing system with little or no disturbance to normal operations. Natural gas may eliminate venting or flaring typical to energized fracture treatments as needed to achieve suitable gas composition for sales gas, i.e. gas with low concentrations of nitrogen and carbon dioxide. Further, using natural gas in the fracturing fluid may enable application of a locally available gas to gain the benefit of a gasified fracturing fluid stream without the extensive logistics often associated with nitrogen or carbon dioxide.

A number of specific methods pertain to safely and reliably applying natural gas in the form of liquefied natural gas. Methods using LNG for on-site storage may permit considerable volumes to be stored efficiently and at pressures as low as atmospheric. As a cryogenic liquid one unit volume of LNG contains approximately six hundred volumes of gas at atmospheric conditions. Thus, fewer storage vessels and a much lower storage and feed pressure with reduced flow volumes is required compared to compressed natural gas. Similarly, pressuring natural gas to the extreme pressures encountered in hydraulic fracturing in liquid form as LNG is exceptionally efficient. Again, as a liquid the volumetric rates are much reduced and relatively incompressible as compared to compressed natural gas, compression heating is eliminated and equipment size and numbers drastically reduced. This significantly reduces the complexity of the operation removing many of the costs and hazards which would be present with known techniques. Further, with fewer pieces of equipment operating at lower pressures with fewer connections between equipment, the needed simplicity for frequent movement of the equipment between wells is supported with LNG use. An inert cryogenic gas at a temperature near or below that of the liquefied natural gas is used to quickly, efficiently and safely pre-cool the natural gas pumper and heater to operating temperature prior to introducing the cryogenic LNG. This eliminates or minimizes use of LNG for cool down thereby avoiding the unnecessary flaring and potential safety issues around cooling the system with the flammable liquefied gas. On-site pressure integrity of the cryogenic liquefied natural gas pumping and heating system may be maximized by combining the pumping and heating system on a single unit that. LNG storage tanks are designed to operate under elevated pressures to eliminate or minimize vent gases during storage. The elevated pressure capacity also allows for boost pressurization during LNG withdrawal from the storage tanks at fracturing rates thereby assisting feed to the LNG pumps. As a side stream, vapor from the LNG fracturing pump is directed, as needed to the LNG storage tanks to maintain vessel pressure and create the boost. Energy for heating of the LNG can be acquired in a number of ways, where a preferred embodiment employs heat that is generated without a flame. Such heat for a portable unit can be acquired from the environment, waste or generated heat from internal combustion engine, a catalytic burner or an electric heating element. Alternatively, heat can be generated using a flame based heat source local to the heater or remote to the process as dictated by safety requirements.

The liquid additive may include a base fluid such as water or a liquid hydrocarbon, and a complexing agent. The complexing agent may alter the surface chemistry of a subterranean formation by exchanging ions. The liquid additive may further include additional components including, but not limited to, a salt; a weighting agent; an inert solid; a fluid loss control agent; an emulsifier; a dispersion aid; a corrosion inhibitor; an emulsion thinner; an emulsion thickener; a viscosifying agent; a high-pressure, high-temperature emulsifier-filtration control agent; a surfactant; a particulate; a lost circulation material; a foaming agent; a gas; a pH control additive; a breaker; a biocide; a cross-linker; a stabilizer; a scale inhibitor; a mutual solvent; an oxidizer; a reducer; a friction reducing polymer; a clay stabilizing agent, a consolidating agent and any combination thereof. The additional components may be present in any weight percent in the liquid additive.

In some examples, the amount of an element of the liquid additive may vary during pumping. By way of example, changing the amount of an element in the liquid additive may be an increase or decrease as a stepwise change, a gradient change, or any combination thereof. In some embodiments, where multiple elements are introduced simultaneously, the amount of one or more elements may change during the step. In some embodiments, the amount of element(s) may stay constant while the amount of other additive(s), including those described above, are changed. In some embodiments, both the amount of element(s) and additive(s) may change within a step. In some embodiments, an element may be introduced into the well bore after the well bore pressure increases and begins to level off. In some embodiments, an element may be introduced into the well bore during substantially steady-state well bore pressure.

Examples of suitable complexing agents include, but are not limited to, aminopolycarboxylic acids (APCAs) such as methylglycindiacetic acid (MGDA), glutamic acid diacetic acid (GLDA), (Hydroxyethyl)ethylenediaminetriacetic acid (HEDTA), ethylenediaminetetraacetic acid (EDTA), hydroxyiminodisuccinic acid (HIDS), polyether multicarboxylic acids, and diethylenetriamine pentaacetate (DTPA). Another suitable complexing agent includes hydrocarboxylic acids, such as oxalic acid, citric acid, glycolic acid, tartaric acid, lactic acid, gluconic acid, malonic acid, and maleic acid. Another suitable complexing agent may include phosphonic acids such as those with the general structure R—$PO_3$—H and phosphonoaminopolycarboxylic acids such as N-(Phosphonomethyl)iminodiacetic acid (PMIDA) and phosphonotricarboxylic acid. The specific complexing agents chosen is dependent on the formation mineralogy, properties, and desired degree of surface modification. For instance, phosphonates may have a stronger adherence or binding affinity for hard Lewis acids and such tendency may be lessened towards divalent Group 2 (IIA) cations while aminocarboxylic acids may display a weaker affinity in relation to such complexing agents. This characteristic can be used to drive the extent of metal coordination and modification. The complexing agent may be present in the liquid additive in any suitable amount, for example, in a range of about 0.05% to about 5% by weight. Alternatively, about 0.05% to about 0.1%, about 0.1% to about 0.5%, about 0.5% to about 1%, about 1% to about 1.5%, about 1.5% to about 2%, about 2% to about 2.5%, about 2.5% to about 3%, about 3% to about 3.5%, about 3.5% to about 4%, about 4% to about 4.5%, or about 4.5% to about 5%. High concentrations of the complexing agent may weaken the subterranean formation by dissolving and removing too much material. The complexing agent may increase the permeability of existing and new fractures by removing formation material though dissolution. A complexing agent may form two or more coordinate bonds between a polydentate ligand and a central atom during a chelation reaction. The chelation reaction may remove a central atom, such as a metal atom, from the formation surface leaving a hole or discontinuity. A surfactant may then more readily bond with the formation surface at the hole or discontinuity.

Additionally, the complexing agent aid in displacing native metal species in the formation by dissolution, followed by binding, followed by adsorption to change the wetting characteristic of the formation surface. A fluid including the complexing agent and a surfactant combination tuned for a specific formation mineralogy or surface chemistry may selectively dissolve native metal species followed by binding of the surfactant to the exposed surface such as, for example, with divalent ions or Lewis centers, or incorporation of a specific divalent ion such as a brine present in the fluid into the surface to substitute calcium or magnesium ions. The substitution may drive the overall wettability towards a water-wet state and may facilitate attachment of surfactant to the magnesium substituted site.

The liquid additive may include a surfactant. The surfactant may be any surfactant such as, without limitation, non-ionic: (branched or linear C10-C18 alcohols, ethoxylated (EO), C8-C18 alkanolamides, ethoxylated (EO) tall oils, ethoxylated (EO) C8-C18 alkylmines, C8-C16 alkylpolyglucosides), anionic: (dodecylbenzene sulfonate salts, alkyl diphenylether sulfonate salts, alpha olefin sulfonate salts, C8-C16 alkyl sulfate salts), cationic: (C8-C18 amine oxides, benzyldimethylalkanolammonium chlorides), and amphoteric: (betaine or sultain containing surfactants). Any of the surfactants could be introduced as an individual surfactant, blend of multiple surfactants, or formulated into a microemulsion, or nanofluid. The surfactant may be oil or water wetting. The surfactant may be present in the liquid additive in any suitable amount, for example, in a range of about 0.01% to about 0.1%, about 0.1% to about 5% by weight. Alternatively, about 0.1% to about 0.5%, about 0.5% to about 1%, about 1% to about 1.5%, about 1.5% to about 2%, about 2% to about 2.5%, about 2.5% to about 3%, about 3% to about 3.5%, about 3.5% to about 4%, about 4% to about 4.5%, or about 4.5% to about 5%.

As previously mentioned, the liquid additive may include a base fluid such as water or a liquid hydrocarbon. Some other base fluids may include, but are not limited to, aqueous fluids, non-aqueous fluids, slickwater fluids, aqueous gels, viscoelastic surfactant gels, foamed gels, and emulsions, for example. Examples of suitable aqueous fluids include fresh water, saltwater, brine, seawater, and/or any other aqueous fluid that does not undesirably interact with the other components used in accordance with present embodiments or with the subterranean formation. Examples of suitable non-aqueous fluids include organic liquids, such as hydrocarbons (e.g., kerosene, xylene, toluene, or diesel), oils (e.g., mineral oils or synthetic oils), esters, and the like. Suitable slickwater fluids are generally prepared by addition of small concentrations of polymers to water to produce what is known in the art as "slick-water." Suitable aqueous gels may generally include an aqueous fluid and one or more gelling agents. Suitable emulsions may include two immiscible liquids such as an aqueous fluid or gelled fluid and a hydrocarbon. Foams may be created by the addition of a gas, such as carbon dioxide, nitrogen, and natural gas. In some embodiments, the liquid additive may include a foaming agent which when mixed with the natural gas generates a foam which is subsequently injected into the wellbore and subterranean formation. In certain embodiments, the treatment fluids are aqueous gels that include an aqueous fluid, a gelling agent for gelling the aqueous fluid and increasing its viscosity, and, optionally, a crosslinking agent for crosslinking the gel and further increasing the viscosity of the fluid. The increased viscosity of the gelled, or gelled and crosslinked, treatment fluid, inter alia, reduces fluid loss and allows the treatment fluid to transport significant quantities of suspended particulates. The density of the treatment fluid can be increased to provide additional particle transport and suspension in some embodiments. In certain embodiments, aqueous gels which may be crosslinked can be used as the second treatment fluid and/or the third treatment fluid.

In certain embodiments a friction reducing polymer may be used. The friction reducing polymer may be included in the liquid additive to form a slickwater fluid. The friction reducing polymer may be a synthetic polymer. The friction reducing polymer may be an anionic polymer or a cationic polymer, in accordance with particular embodiments. By way of example, suitable synthetic polymers may include any of a variety of monomeric units, including acrylamide, acrylic acid, 2-acrylamido-2-methylpropane sulfonic acid, N,N-dimethylacrylamide, vinyl sulfonic acid, N-vinyl acetamide, N-vinyl formamide, itaconic acid, methacrylic acid, acrylic acid esters, methacrylic acid esters and combinations thereof. Some friction reducing polymers may be in an acid form or in a salt form. A variety of salts may be prepared, for example, by neutralizing the acid form of the acrylic acid monomer or the 2-acrylamido-2-methylpropane sulfonic acid monomer. In addition, the acid form of the polymer may be neutralized by ions present in the treatment fluid. Indeed, as used herein, the term "polymer" in the context of a friction reducing polymer, is intended to refer to the acid form of the friction reducing polymer, as well as its various salts.

Where used, the friction reducing polymer may be included in the treatment fluids, for example, in an amount equal to or less than 0.2% by weight of the water present in the liquid additive. In some embodiments, the friction reducing polymers may be included in embodiments of the liquid additive in an amount sufficient to reduce friction without gel formation upon mixing. By way of example, the liquid additive including the friction reducing polymer may not exhibit an apparent yield point. While the addition of a friction reducing polymer may minimally increase the viscosity of the liquid additive, the polymers are generally not included in the example liquid additive in an amount sufficient to substantially increase the viscosity. For example, if proppant is included in the liquid additive, velocity rather than fluid viscosity generally may be relied on for proppant transport. In some embodiments, the friction reducing polymer may be present in an amount in the range of from about 0.01% to about 0.15% by weight of the water. In some embodiments, the friction reducing polymer may be present in an amount in the range of from about 0.025% to about 0.1% by weight of the water.

Embodiments of the methods may also include a combination of variously sized proppants introduced via a fracturing fluid into a well bore penetrating a subterranean formation. The variously sized proppant may be introduced into a well bore via a plurality of fracturing fluids in sequential application or injection stages. As used herein, the term "proppant" refers to any material or formulation that can be used to hold open or prop open at least a portion of a fracture network. Proppants typically may be particulate in nature. The portion of the fracture network that may be propped open may include any such portion of the fracture network including the primary fracture, secondary fractures, tertiary fractures, quaternary fractures, and the like. It should be understood that the term "proppant" and derivatives thereof as used in this disclosure, include all known shapes of materials, including substantially spherical materials, low to high aspect ratio materials, fibrous materials, polygonal materials (such as cubic materials), and mixtures thereof.

In some examples, at least one access conduit from the well bore to the subterranean formation may be created. In some embodiments, at least one access conduit from the well bore to the subterranean formation may be provided. These access conduits may be made by any means or technique known in the art including, but not limited to, hydrajetting, laser inscribing, perforating, not casing at least a portion of the well bore, and the like. Access conduits may be spaced randomly, spaced substantially equidistant from each other, clustered in groups (e.g., an access conduit cluster), or any combination thereof along the length of the well bore.

Proppants suitable for use in particular embodiments may include any material suitable for use in subterranean operations. Proppant may individually include a variety of materials, including, but not limited to, sand, bauxite, ceramic materials, glass materials, polymer materials, polytetrafluoroethylene materials, nut shell pieces, cured resinous particulates including nut shell pieces, seed shell pieces, cured resinous particulates including seed shell pieces, fruit pit pieces, cured resinous particulates including fruit pit pieces, wood, composite particulates, and combinations thereof. Suitable composite particulates may include a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and combinations thereof.

The proppant may be carried by the fracturing fluid into the subterranean formation. Concentrations of the proppant may range from about 0.1 ppg (12 kg/m$^3$) to about 10 ppg (1200 kg/m$^3$) and in further embodiments from about 0.2 ppg (24 kg/m$^3$) to about 6 ppg (719 kg/m$^3$). These ranges encompass every number in between, for example the concentration may range between about 0.5 ppg (60 kg/m$^3$) to about 4 ppg (480 kg/m$^3$). One of ordinary skill in the art with the benefit of this disclosure should be able to select an appropriate amount of proppant to use for a particular application.

FIG. 1 is a generic depiction of the main components of the fracturing system according to those embodiments which utilize a fracturing fluid mixture including natural gas and the liquid additive that may contain a proppant and a chelating agent, as disclosed herein. A base fluid may be stored in a fracturing liquid tank (100), proppant may be stored in a proppant supply container (106), and chemical additives such as a viscosifiers, surfactants, complexing agents, and other chemicals previously mentioned may be stored in at least one chemical additive container (104). Natural gas may be stored in a natural gas container (112) and a natural gas stream may be pressurized and supplied by a natural gas pump (114) and enters a fracturing fluid mixer (120) via a conduit (116). The natural gas stored in container (112) can be compressed natural gas or liquefied natural gas. The natural gas pump (114) may be a compressor if compressed natural gas is the source or a specialized liquefied natural gas fracturing pump if liquefied natural gas is the source. The output from the natural gas pump (114), regardless of the state of the source gas, may be in a gaseous state at or above a fracture gradient of the subterranean formation.

Within the fracturing fluid mixer (120), the natural gas stream from conduit (116) may be combined with the liquid additive from conduit (118) to form a fracturing fluid; this liquid additive may include proppant and other chemicals previously described. The combined fracturing mixture then enters a well (124) via a conduit (122) where it travels down the wellbore to the reservoir creating the hydraulic fracture using the rate and pressure of the fracturing fluid. The complexing agent may react with the formation to form sites where a surfactant may bond. Upon applying the desired fracturing materials within the well (124), injection is stopped and placement of the fracturing treatment is complete. Following the fracture treatment and at a time deemed suitable for the well being fractured, the well (124) is opened for flow with the stream directed to a conduit (126) and then through a separator vessel (128) wherein gases are separated from liquids. Initial flow from the well will mostly include the injected fracturing materials. Separator vessel (128) is used to separate the injected natural gas from the recovered stream through the conduit (126). The liquids and solids recovered from separator vessel (128) are directed to tanks or holding pits (not shown). The natural gas from the recovered stream exits the separator vessel (128) and is initially directed to a flare (130) until flow is suitably stabilized, then directed to a pipeline (132) for processing and sale.

Figure 2:
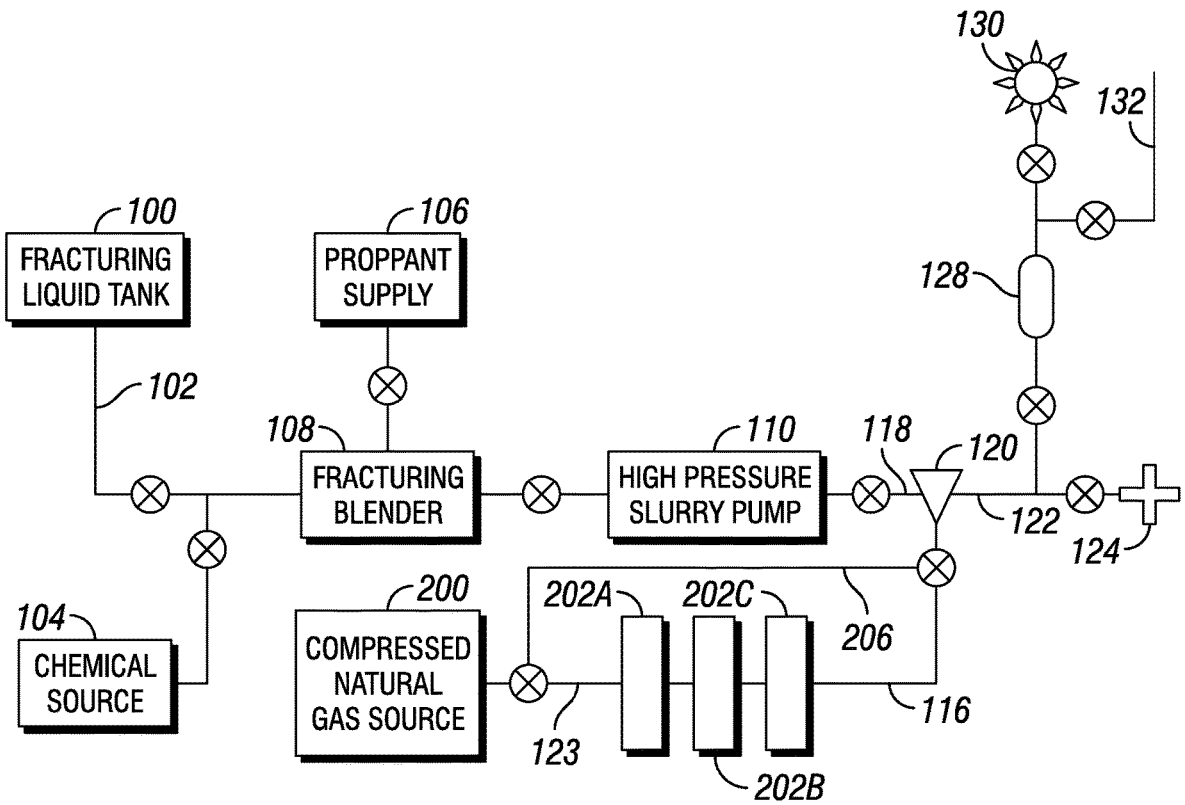
FIG. 2 is a schematic illustrating the main components of a fracturing system as shown in FIG. 1, which includes compressed natural gas storage and supply equipment.

Referring to FIG. 2, a system is shown for fracturing a subterranean reservoir penetrated by a well using a fracturing fluid mixture. The fracturing fluid mixture is formed by blending a natural gas stream with the liquid additive, wherein the natural gas is from a compressed natural gas source. The liquid additive used may include a proppant. The proppant may be any proppant previously described.

The main components of the system include a fracturing liquid supply tank (100), equipment for conveying and prepping the liquid additive for combination with a natural gas stream, a natural gas container, equipment for conveying the natural gas stream for combination with the liquid additive, a mixer for combining the liquid additive and the natural gas stream to form the fracturing fluid mixture and equipment for conveying the fracturing fluid mixture to the wellhead. A fracturing liquid tank (100) suitable for water or hydrocarbon based liquids is connected via a conduit (102) to a fracturing blender (108) with viscosifying chemicals, the complexing agent, and other previously motioned additives added via a conduit from chemical additive container (104). The fracturing liquid tanks (100) may be any of those common within the industry for hydraulic fracturing and may apply more than one tank or other suitable arrangement to store sufficient liquid volume. The conduit (102) like all other conduits shown on the FIG. 2, may be a pipe or hose rated to the described application and conditions. The blender (108) may receive the liquids and proppant from a proppant supply container (106) to form a liquid additive.

The blender (108) may a multiple task unit that draws liquids from the fracturing fluids tank with a centrifugal pump (not shown), accepts chemicals from the chemical additive container (104) and mixes them with the fracturing fluid, often within the centrifugal pump.

The liquid additive may then be pumped via a conduit from the blender (108) to a slurry pump (110). The slurry pump (110) pressurizes the proppant slurry to a suitable fracturing pressure and is connected via a conduit (122) to a fracturing fluid mixer (120). More than one pump may be used as the slurry pump (110). Some of the foregoing components may be combined such as the blender (108) and slurry pump (110).

In this embodiment shown on FIG. 2, the natural gas source may be one or more vessels (200) containing compressed natural gas (CNG). The CNG storage vessel (200) may be connected to a natural gas compressor pump, herein shown as pumps (202 a, 202 b, 202 c), via conduit (204) with control valve (V4) and is used to compress the gas to the fracturing pressure. Compression may be accomplished by any pump capable of increasing the pressure within a gas stream; for example reciprocating compressors may be applied to achieve high pressure such as that required for hydraulic fracturing. Typically compressors achieve a fixed compression factor, such that multiple stages of compression may be required to attain fracturing pressure. Similarly, in order to achieve the desired rate, a multiple of compressor stages may be applied in parallel. The natural gas compressor pump (202 a, 202 b, 202 c) is shown with three compression stages though more or fewer compressor stages may be needed to achieve the desired outlet pressure; however, more or less than three compression stages may be used. Flow of the compressed natural gas from the storage vessel (200) to the natural gas compressor pumps (202 a, 202 b, 202 c) may be controlled with a valve (V4). The natural gas compressor pump (202 a, 202 b, 202 c) may be connected to the fracturing fluid mixer (120) via conduit (116) with gas control valve (V61). Flow of the pressured natural gas from the natural gas compressor pumps (202 a, 202 b, 202 c) to the fracturing fluid mixer (120) may be controlled with valve (V61). Should the pressure of the compressed gas within the vessel be sufficiently above the fracturing pressure, the gas can be controlled by valves (V4) and (V61) directly to the natural gas slurry stream mixer via conduit (206) and bypassing the high pressure natural gas pump compressors (202 a, 202 b, 202 c) using valve (V4).

Figure 3:
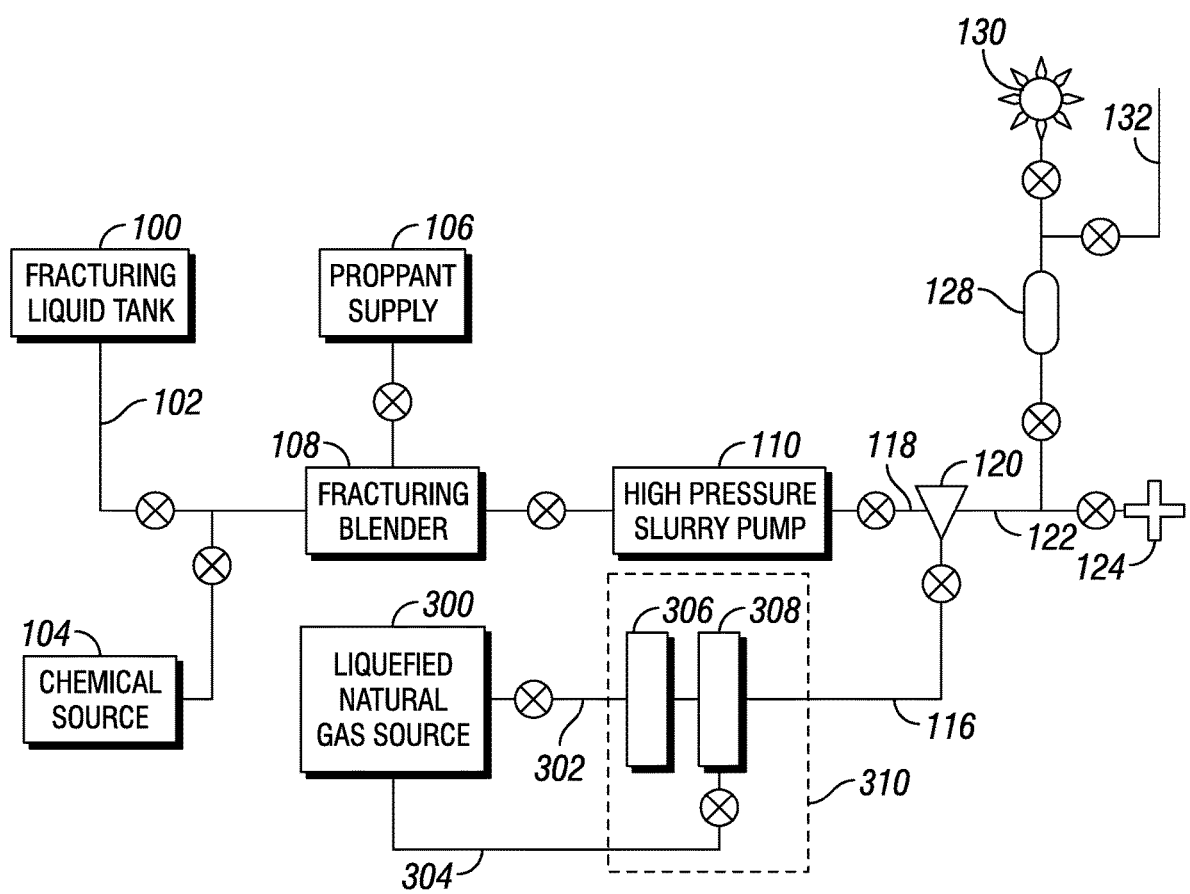
FIG. 3 is a schematic illustrating the main components of a fracturing system as shown in FIG. 1 which includes liquefied natural gas (LNG) storage and supply equipment.

Referring to FIG. 3, a formation fracturing system is provided which uses the liquid additive and natural gas from a liquefied natural gas source. In particular, the fracturing system includes an LNG storage and vapor management sub-system for storing LNG and pressurizing and heating the LNG to the application temperature then supplying the natural gas to be mixed with the liquid additive. In this embodiment, the LNG is heated to a temperature wherein the natural gas is in a vapor phase; however in other embodiments that the natural gas can be heated to a temperature wherein the natural gas remains in a liquid phase. FIG. 3 shows the fracturing system of FIG. 1 with such a LNG storage and vapor management sub-system.

In this embodiment, the natural gas source (300) may be one or more vessels containing liquefied natural gas (LNG). LNG is typically stored at atmospheric pressure at a temperature of approximately −162° C. (−260° F.). The natural gas source (300) is connected to pump assembly (308) via LNG supply conduit (302) with supply valve (V42). The pump assembly (308) may be arranged to pressure the LNG to the fracturing pressure with pump component (306) and then heat the pressured LNG to compressed gas with heater component (308) of the pump assembly (308). The supply conduit (302) may be a fit for purpose LNG conduit.

Replacement for liquid volumes removed from natural gas source (300), may be accomplished by directing a stream of the created pressurized gas from heater component (308) through return conduit (304) with control of the stream by return valve (V11). The replacement vapor may be controlled to maintain suitable pressure within the natural gas source (300). Transfer of LNG from the natural gas source (300) to the pump assembly (308) may be supported by the returning vapor stream in return conduit (304) providing sufficient pressure in the natural gas source (300) to supply the stream of LNG to the inlet of the pump assembly (308). In one configuration, the pump assembly (308) may combine pressurization and heating of the LNG within a single unit, for example, in one housing, on a self-contained skid, through one active device, etc. However, these steps can be accomplished on separate units. All components contacted by the LNG must be suitable for cryogenic service. Flow of the pressured natural gas from the pump assembly (308) to the fracturing fluid mixer (120) may be controlled with valve (V6) and through natural gas supply conduit 24.

Figure 4:
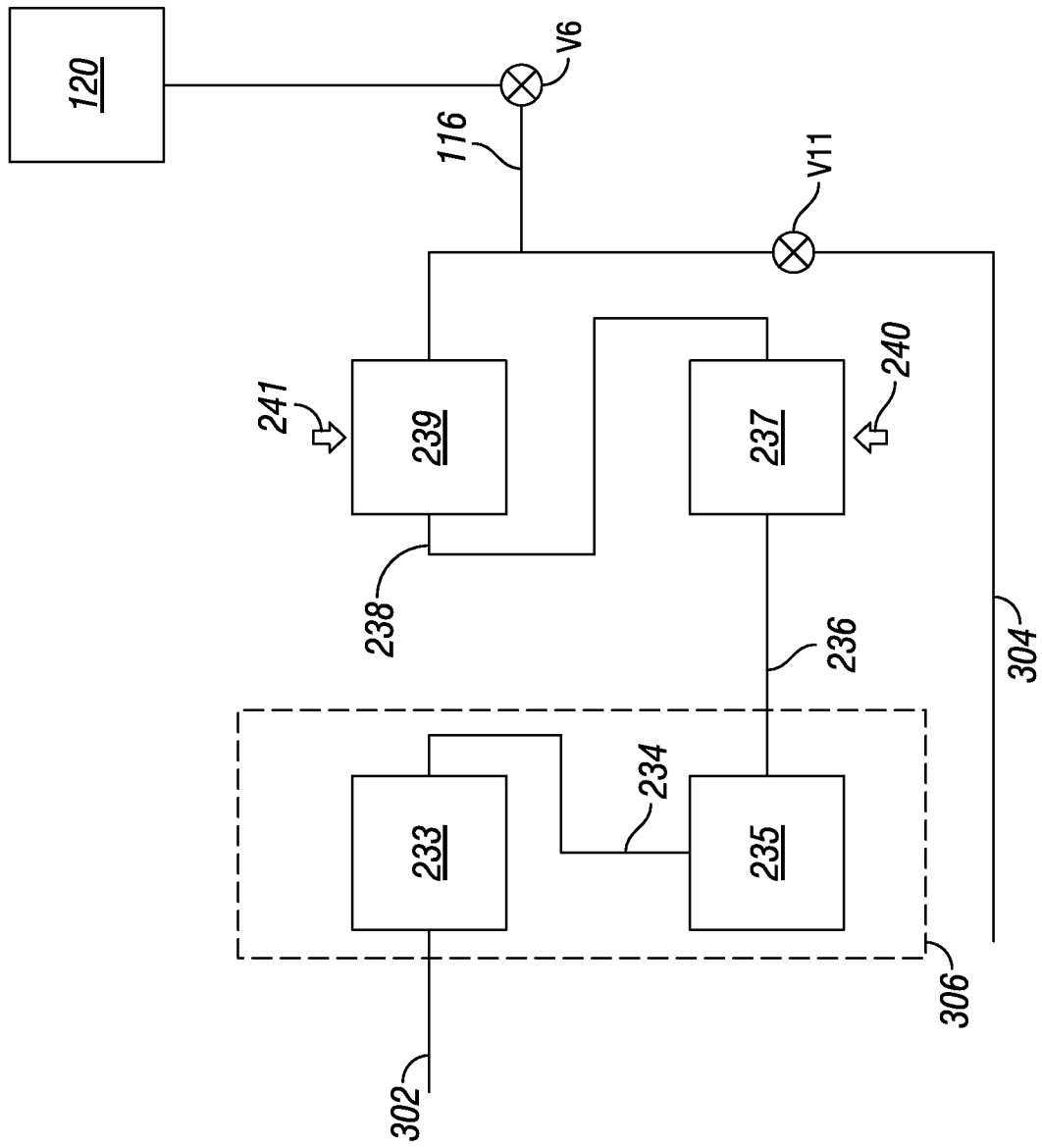
FIG. 4 is a schematic illustrating the main components of an LNG fracturing pump assembly.

FIG. 4 is a schematic illustrating the main components of the pump assembly (308). LNG may be fed to the pump component (306) from supply conduit (302). The pump component may include a cryogenic centrifugal pump (233), a LNG pump (235) and a conduit (234) interconnecting the cryogenic centrifugal pump (233) and the LNG pump (235). Adequate feed pressure to the LNG pump (235) is needed to ensure vapor-lock or cavitation does not occur within the pumping cycle. A single or multiple cryogenic centrifugal pumps (233) may be applied as needed to meet the feed pressure and rate requirement to support the LNG pump (235). The LNG pump (235) is rated to pressurize LNG to at least 35 MPa (5076 psi) and up to as high as 100 MPa (15,000 psi) in order to provide sufficient pressure to fracture the formation. A positive displacement pump such as a piston pump can be used to achieve these pressures though other pump styles generating sufficient rate and pressure can also be applied. Single or multiple LNG pumps (235) may be applied to meet the fracturing feed rate requirement. Power needed to drive the pumps (233) and (235) can be obtained from an internal combustion engine through direct drive, generated electricity, or hydraulics as desired.

Pressured LNG exiting from the LNG pumps (235) may be directed to a heater component (308) using conduit (236) to heat the natural gas to the application temperature, which in this specific embodiment changes the phase of the natural gas from liquid to gas. Generally, the minimum temperature to heat LNG is approximately −77° C. (−107° F.) and this temperature is where many carbon steels transform from austenite to martensite crystals with a corresponding change in metallurgy. In one embodiment, a natural gas outlet temperature to conduits (116) and (304) is in the range of 0° C. (32° F.) to 20° C. (68° F.) to avoid contacted liquid freezing issues and to maintain elasticity of seals. Within the heater component (308) may be a heat exchanging system as needed to transfer heat to the LNG, and in this embodiment includes a first heat exchanger (237), a second heat exchanger (239) downstream of the first heat exchanger, and a natural gas supply conduit (238) which extends from the conduit (236) and through the two heat exchangers (237, 239), and which couples to conduit (116) as well as return valve (V11). Return valve (V11) in turn may be coupled to return conduit (304).

In this embodiment, the LNG may first heated by heat source (240) which is proposed as heat derived from air, typically driven across the heat exchanger coils within the first heat exchanger (237) by a blower (not shown). LNG at a temperature approaching −162° C. (−260° F.) can derive significant energy from air resulting in a lightened heating load. The discharge from the first heat exchanger (237) is then directed to the heat exchanger coils within the second heat exchanger (239) through the supply conduit (238). Within the second heat exchanger (239), the LNG is heated to the target outlet temperature by another heat source (241). The energy available from this other heat source (241) must be significant in order to support rapid heating of the LNG. The heat source (241) can be generated without flame and may be waste or generated heat from an internal combustion engine, a catalytic burner or an electric element. Alternatively heat can be generated using a flame based heat source local to the heater or remote to the process as dictated by safety requirements. Outlet of the pressurized gaseous natural gas may be via supply conduit (116) with gas control valve (V6) to the fracturing fluid mixer (120).

Once the natural gas has been sufficiently heated (which in this specific embodiment means vaporized into a gaseous state), it flows through conduit (116) and may be mixed with the liquid additive in the fracturing fluid mixer (120). The fluid pressures handled in the fracturing fluid mixer (120) may be significant, fluid abrasion may be a significant factor and leaks are to be avoided. With respect to throughput, effective component mixing is important.

Accordingly, this disclosure describes systems, methods, and compositions that may relate to subterranean operations. The systems, methods, and compositions may further be characterized by one or more of the following statements:

Statement 1: A method including: preparing a liquid additive including: a base fluid; a complexing agent; and a surfactant; increasing a pressure of the liquid additive to above a fracture gradient of a subterranean formation; increasing a pressure of a natural gas stream, wherein the natural gas stream includes liquefied natural gas or compressed natural gas, to above the fracture gradient of the subterranean formation; mixing the liquid additive and natural gas stream to form a fracturing fluid; injecting the fracturing fluid into a the subterranean formation; fracturing the subterranean formation to form or extend at least one fracture; and allowing the complexing agent to react with the subterranean formation.

Statement 2: The method of statement 1 wherein the base fluid is selected from the group consisting of water, a liquid hydrocarbon, and combinations thereof.

Statement 3: The method of statement 1 or statement 2, wherein the complexing agent is selected from the group consisting of methylglycindiacetic acid (MGDA), glutamic acid diacetic acid (GLDA), (Hydroxyethyl)ethylenediaminetriacetic acid (HEDTA), ethylenediaminetetraacetic acid (EDTA), hydroxyiminodisuccinic acid (HIDS), polyether multicarboxylic acids, diethylenetriamine pentaacetate (DTPA), oxalic acid, citric acid, glycolic acid, tartaric acid, lactic acid, gluconic acid, malonic acid, and maleic acid, phosphonic acids with the general structure R—PO$_3$—H, N-(Phosphonomethyl)iminodiacetic acid (PMIDA), and phosphonotricarboxylic acid.

Statement 4: The method of any preceding statement wherein the liquid additive further includes a proppant.

Statement 5: The method of any preceding statement wherein the complexing agent is present in the liquid additive in an amount of about 0.01% to about 5% by weight.

Statement 6: The method of any preceding statement wherein the surfactant is selected from the group consisting of branched or linear C10-C18 alcohols, ethoxylated C8-C18 alkanolamides, ethoxylated tall oils, ethoxylated C8-C18 alkylmines, C8-C16 alkylpolyglucosides, dodecylbenzene sulfonate salts, alkyl diphenylether sulfonate salts, alpha olefin sulfonate salts, C8-C16 alkyl sulfate salts, C8-C18 amine oxides, benzyldimethylalkanolammonium chlorides, betaine compounds, or sultain compounds, and combinations thereof.

Statement 7: The method of any preceding statement wherein the surfactant is present in the liquid additive in an amount of about 0.01% to about 5% by weight.

Statement 8: The method of any preceding statement wherein the liquid additive further includes a foaming agent.

Statement 9: The method of any preceding statement wherein the natural gas stream is increased in pressure by a pump when the natural gas stream is the liquefied natural gas or a compressor when the natural gas stream is the compressed natural gas.

Statement 10: A method including: preparing a liquid additive including: a base fluid; a complexing agent; a surfactant; and a proppant; increasing a pressure of the liquid additive to above a fracture gradient of a subterranean formation; increasing a pressure of a liquefied natural gas to above the fracture gradient of the subterranean formation; heating the liquefied natural gas to produce a gaseous natural gas; mixing the liquid additive and gaseous natural gas to form a fracturing fluid; injecting the fracturing fluid into a the subterranean formation; fracturing the subterranean formation to form or extend at least one fracture; and allowing the complexing agent to react with the subterranean formation.

Statement 11: The method of statement 10 wherein the base fluid is selected from the group consisting of water, a liquid hydrocarbon, and combinations thereof.

Statement 12: The method of statement 10 or statement 11 wherein the complexing agent is selected from the group consisting of methylglycindiacetic acid (MGDA), glutamic acid diacetic acid (GLDA), (Hydroxyethyl)ethylenediaminetriacetic acid (HEDTA), ethylenediaminetetraacetic acid (EDTA), hydroxyiminodisuccinic acid (HIDS), polyether multicarboxylic acids, diethylenetriamine pentaacetate (DTPA), oxalic acid, citric acid, glycolic acid, tartaric acid, lactic acid, gluconic acid, malonic acid, and maleic acid, phosphonic acids with the general structure R—PO$_3$—H, N-(Phosphonomethyl)iminodiacetic acid (PMIDA), and phosphonotricarboxylic acid, and combinations thereof.

Statement 13: The method of any one of statements 10 to 12 wherein the complexing agent is present in the liquid additive in an amount of about 0.01% to about 5% by weight.

Statement 14: The method of any one of statements 10 to 13 wherein the surfactant is selected from the group consisting of branched or linear C10-C18 alcohols, ethoxylated C8-C18 alkanolamides, ethoxylated tall oils, ethoxylated C8-C18 alkylmines, C8-C16 alkylpolyglucosides, dodecylbenzene sulfonate salts, alkyl diphenylether sulfonate salts, alpha olefin sulfonate salts, C8-C16 alkyl sulfate salts, C8-C18 amine oxides, benzyldimethylalkanolammonium chlorides, betaine compounds, or sultain compounds, and combinations thereof.

Statement 15: The method of any one of statements 10 to 14 wherein the surfactant is present in the liquid additive in an amount of about 0.01% to about 5% by weight.

Statement 16: The method of any one of statements 10 to 15 wherein the liquid additive further includes a foaming agent.

Statement 17: The method of any one of statements 10 to 17 wherein the pressure of the liquefied natural gas stream is increased in pressure by a pump.

Statement 18: A fracturing fluid including: methane; water; a complexing agent; a surfactant; and wherein the fracturing fluid is an emulsion, the water is in a continuous phase of the emulsion, and methane is in a discrete phase of the emulsion.

Statement 19: The fracturing fluid of statement 18 wherein the complexing agent is selected from the group consisting of aminopolycarboxylic acids, hydrocarboxylic acids, phosphonic acids, and combinations thereof.

Statement 20: The fracturing fluid of statement 18 or statement 19 wherein the complexing agent is present in an amount of about 0.01% to about 5% by weight of the fracturing fluid.

It is also to be recognized that the disclosed fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Although individual embodiments are discussed, the invention covers all combinations of all those embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present invention. If there is any conflict in the usages of a word or term in this specification and one or more patent(s) or other documents that may be incorporated herein by reference, the definitions that are consistent with this specification should be adopted.

What is claimed is:

1. A method comprising:
    preparing a liquid additive comprising:
        a base fluid;
        a complexing agent selected from the group consisting of methylglycindiacetic acid (MGDA), glutamic acid diacetic acid (GLDA), (Hydroxyethyl)ethylenediaminetriacetic acid (HEDTA), ethylenediaminetetraacetic acid (EDTA), hydroxyiminodisuccinic acid (HIDS), polyether multicarboxylic acids, diethylenetriamine pentaacetate (DTPA), oxalic acid, citric acid, glycolic acid, lactic acid, and maleic acid, N-(Phosphonomethyl)iminodiacetic acid (PMIDA), phosphonotricarboxylic acid, and combinations thereof; and
        a water wetting surfactant;
    increasing a pressure of the liquid additive to above a fracture gradient of a subterranean formation;
    increasing a pressure of a natural gas stream, wherein the natural gas stream comprises liquefied natural gas or a compressed natural gas, to above the fracture gradient of the subterranean formation;
    mixing the liquid additive and natural gas stream to form a fracturing fluid;
    injecting the fracturing fluid into the subterranean formation;
    fracturing the subterranean formation to form or extend at least one fracture;
    allowing the complexing agent to react with the subterranean formation to form a surfactant bonding site; and
    adhering the water wetting surfactant to the surfactant bonding site.

2. The method of claim 1 wherein the base fluid is selected from the group consisting of water, a liquid hydrocarbon, and combinations thereof.

3. The method of claim 1 wherein the liquid additive further comprises a proppant.

4. The method of claim 1 wherein the complexing agent is present in the liquid additive in an amount of about 0.01% to about 5% by weight.

5. The method of claim 1 wherein the surfactant is selected from the group consisting of branched or linear C10-C18 alcohols, ethoxylated C8-C18 alkanolamides, ethoxylated tall oils, ethoxylated C8-C18 alkylmines, C8-C16 alkylpolyglucosides, dodecylbenzene sulfonate salts, alkyl diphenylether sulfonate salts, alpha olefin sulfonate salts, C8-C16 alkyl sulfate salts, C8-C18 amine oxides, benzyldimethylalkanolammonium chlorides, betaine compounds, or sultain compounds, and combinations thereof.

6. The method of claim 1 wherein the surfactant is present in the liquid additive in an amount of about 0.01% to about 5% by weight.

7. The method of claim 1 wherein the liquid additive further comprises a foaming agent.

8. The method of claim 1 wherein the natural gas stream is increased in pressure by a pump when the natural gas stream is the liquefied natural gas or a compressor when the natural gas stream is the compressed natural gas.

9. The method of claim 1, wherein the liquid additive further comprises a friction reducing polymer present in an amount of about 0.01% to about 0.15% by weight of the water.

10. The method of claim 1, wherein the natural gas stream is pressurized to at least about 35 MPa up to about 100 MPa.

11. A method comprising:
preparing a liquid additive comprising:
a base fluid;
a complexing agent selected from the group consisting of methylglycindiacetic acid (MGDA), glutamic acid diacetic acid (GLDA), (Hydroxyethyl)ethylenediaminetriacetic acid (HEDTA), ethylenediaminetetraacetic acid (EDTA), hydroxyiminodisuccinic acid (HIDS), polyether multicarboxylic acids, diethylenetriamine pentaacetate (DTPA), oxalic acid, citric acid, glycolic acid, lactic acid, and maleic acid, N-(Phosphonomethyl)iminodiacetic acid (PMIDA), phosphonotricarboxylic acid, and combinations thereof;
a water wetting surfactant; and
a proppant;
increasing a pressure of the liquid additive to above a fracture gradient of a subterranean formation;
increasing a pressure of a liquefied natural gas to above the fracture gradient of the subterranean formation;
heating the liquefied natural gas to produce a gaseous natural gas;
mixing the liquid additive and gaseous natural gas to form a fracturing fluid;
injecting the fracturing fluid into the subterranean formation;
fracturing the subterranean formation to form or extend at least one fracture;
allowing the complexing agent to react with the subterranean formation to form a surfactant bonding site; and
adhering the water wetting surfactant to the surfactant bonding site.

12. The method of claim 11 wherein the base fluid is selected from the group consisting of water, a liquid hydrocarbon, and combinations thereof.

13. The method of claim 11 wherein the complexing agent is present in the liquid additive in an amount of about 0.01% to about 5% by weight.

14. The method of claim 11 wherein the surfactant is selected from the group consisting of branched or linear C10-C18 alcohols, ethoxylated C8-C18 alkanolamides, ethoxylated tall oils, ethoxylated C8-C18 alkylmines, C8-C16 alkylpolyglucosides, dodecylbenzene sulfonate salts, alkyl diphenylether sulfonate salts, alpha olefin sulfonate salts, C8-C16 alkyl sulfate salts, C8-C18 amine oxides, benzyldimethylalkanolammonium chlorides, betaine compounds, or sultain compounds, and combinations thereof.

15. The method of claim 11 wherein the surfactant is present in the liquid additive in an amount of about 0.01% to about 5% by weight.

16. The method of claim 11 wherein the liquid additive further comprises a foaming agent.

17. The method of claim 11 wherein the pressure of the liquefied natural gas is increased in pressure by a pump.

18. The method of claim 11, wherein the proppant is present in an amount of about 0.1 ppg to about 10 ppg.

19. The method of claim 11, wherein the liquid additive further comprises a friction reducing polymer present in an amount of about 0.01% to about 0.15% by weight of the water.

20. The method of claim 11, wherein the natural gas stream is pressurized to at least about 35 MPa up to about 100 MPa.

* * * * *